Oct. 6, 1959  G. A. LYON  2,907,603
WHEEL COVER
Original Filed Feb. 17, 1956
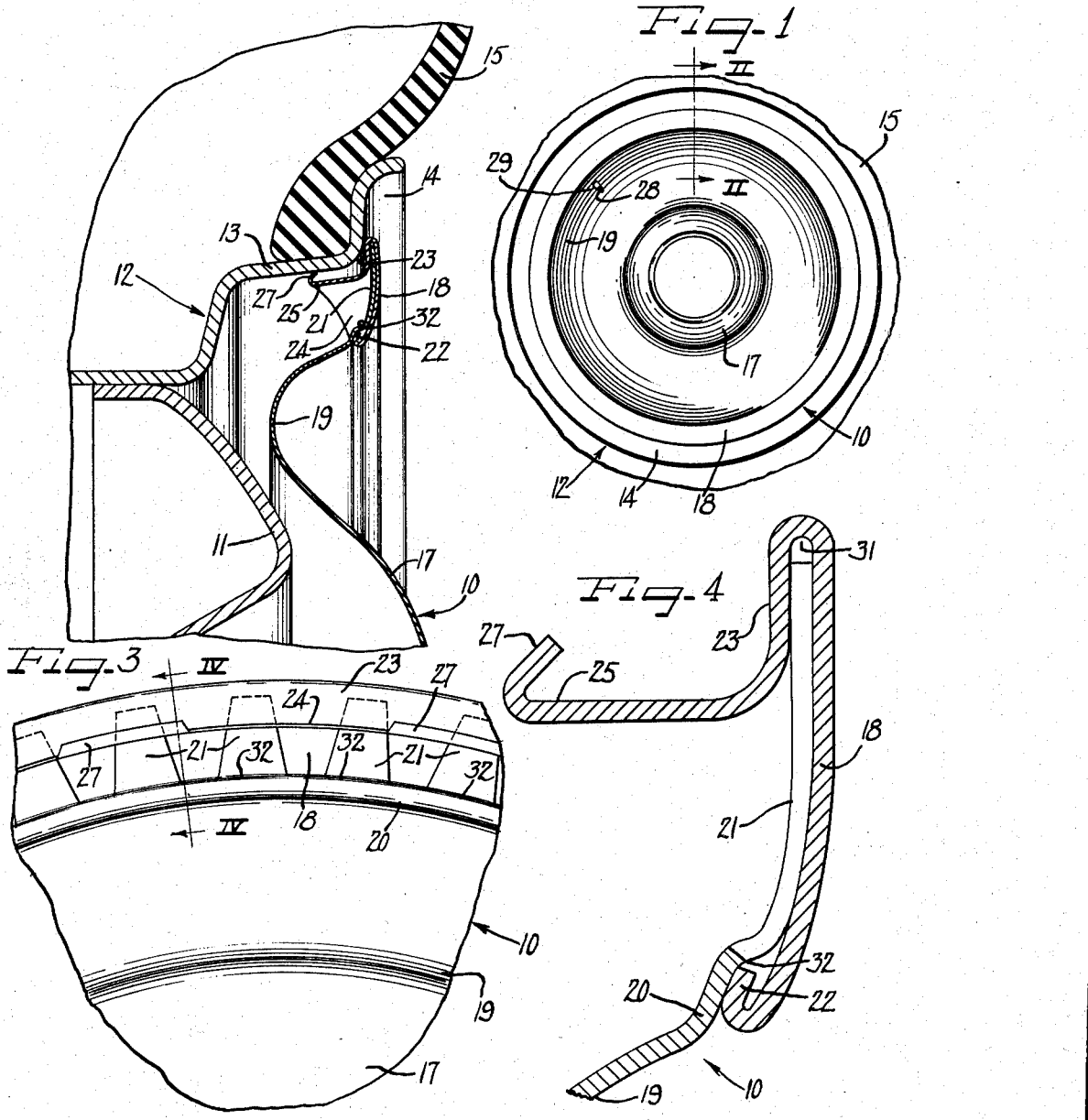
Inventor
George Albert Lyon United States Patent Office 2,907,603
Patented Oct. 6, 1959

2,907,603

WHEEL COVER

George Albert Lyon, Detroit, Mich.

Original application February 17, 1956, Serial No. 566,229. Divided and this application June 14, 1957, Serial No. 665,806

2 Claims. (Cl. 301—37)

The present invention relates to improvements in wheel structures and more particularly concerns the ornamental and protective covering of the outer sides of vehicle wheels.

Certain materials such as sheet aluminum lend themselves well to novel ornamental effects but, on the other hand, may be too soft, in at least certain grades thereof, to secure sufficient resilience or stiffness therein for retaining interengagement with a wheel. For example, anodized aluminum, or otherwise surface treated aluminum affords desirable colors in a selection of shades of which it may be desirable to provide in wheel covers consonant with or in contrast to the finish color or combinations of color of vehicles such as automobiles. Yet it is desirable that the covers be readily applicable to the vehicle wheels by press-on, pry-off retaining means which to be most effective should comprise a work hardenable material of better work hardenable characteristics than aluminum. Such a material may be stainless steel or brass, by way of example.

The principal aim of the present invention is to provide a combination wheel cover construction affording the decorative advantages of a colorable material such as aluminum and the cover retaining advantages of a work hardenable material such as stainless steel or brass.

Another object of the invention is to provide a novel wheel cover comprising a composite of a cover retaining ring member and a cover plate member.

Still another object of the invention is to provide an improved wheel cover wherein a marginal annulus cover retaining flange engageable in press-on, pry-off relation with a portion of a wheel is afforded for a cover plate which is of a sheet metal inherently unsuitable for work hardening to the degree necessary for affording the hardness and resiliency to enable efficient self-retaining gripping of a wheel flange.

Other objects, features and advantages of the present invention will be readily apparent from the following detailed description of a preferred embodiment thereof taken in conjunction with the accompanying drawings, in which:

Figure 1 is an outer side elevational view of a vehicle wheel structure embodying features of the invention;

Figure 2 is a fragmentary radial sectional detail view taken substantially on the line II—II of Figure 1 and on an enlarged scale;

Figure 3 is a fragmentary rear elevational view of the cover of Figures 1 and 2; and Figure 4 is an enlarged fragmentary sectional detail view taken substantially on the line IV—IV of Figure 3.

A wheel cover 10 embodying features of the invention is constructed and arranged for disposition in ornamental and protective relation at the outer side of a vehicle wheel including a wheel body 11 and a tire rim 12 supported thereby and including an intermediate generally radially inwardly facing annular axially outwardly directed flange 13 merging with a terminal flange 14 and constructed and arranged to support a pneumatic tire 15.

According to the present invention, the wheel cover 10 includes a generally circular body member 17 and a circular supporting and cover retaining ring member 18. The two cover members or components are secured together in a composite, permanent assembly and are adapted for ready press-on, pry-off disposition at the outer side of the wheel. The circular cover member 17 may be made from a material of ornamental characteristic such as aluminum that has been anodized or otherwise appropriately colored, while the supporting and retaining ring 18 may be made from suitable stainless steel or brass. Although the cover member 17 may be a ring to cooperate with a central hub cap, in the present instance it is in the form of a disk dimensioned to overlie the wheel body 11 and to substantially overlie the tire rim 12.

The circular cover body 17 may be stamped or drawn to shape, with a central crown portion merging into an intermediate annular dished portion 19 leading at its radially outer side into a stepped annular marginal flange portion 20 from which projetcs a series of radially extending circumferentially spaced interlock tabs or fingers or flange extensions 21 which interengage with the ring member 18, which overlies the same concealingly.

Herein, the ring member 18 is of a diameter to overlie the tire rim and more particularly the intermediate flange 13 thereof, having an inner underturned reinforcing and finishing flange 22 which in the assembly is arranged to seat snugly against the ledge or step provided by the marginal cover flange 20. At its radially outer margin the ring member 18 is provided with an underturned annular flange 23 between which and the body of the member 18 the radially outer end portions of the interlock extensions 21 are clamped. In addition the underturned flange 23 affords a seat bottoming against the radially inner portion of the terminal flange 14 of the wheel rim.

Furthermore, the underturned flange 23 is provided with cover retaining means which may be substantially like the cover retaining means disclosed in my U.S. Patent 2,624,634 dated January 6, 1953. To this end, the underturned flange 23 is provided with an axially inwardly directed continuous annular flange extension 24 of a diameter to fit in freely spaced relation telescopically within the axially outer portion of the intermediate flange 13 of the tire rim. From the axial flange 24 extends a suitable series such as 8 to 16 cover retaining fingers 25 each provided with a short and stiff generally radially and axially outwardly oblique retaining terminal 27 which is engageable in retaining gripping edgewise relation with the intermediate flange 13 under resilient tension thrust imparted by the retaining fingers 25 and the axial flange 24 coacting for this purpose.

For applying the cover 10 to the outer side of the wheel, a valve stem 28 is registered through a suitable valve stem opening 29 in the intermediate dished portion 19 of the cover body and the cover is then pressed axially inwardly to engage the retaining fingers 25 with the tire rim until the underturned marginal flange 23 seats against the tire rim. For removing the cover from the wheel, a pry-off tool may be applied behind the reinforced marginal flange 23 of the ring member 18 and pry-off leverage applied to disengage the retaining fingers 25 from the tire rim.

In a desirable construction, the ring member 18 of the cover assembly may be made as a rolled section from suitable strip stock such as stainless steel or brass.

Upon reference to Figures 3 and 4, it will be observed that the marginal flange extensions 21 of the cover body member 17 are received in firmly clamped engagement between the body of the ring member 18 and the underturned flange 23 thereof within an annular radially inwardly opening socket groove or recess 31. By preference, the depth of the socket groove recess 31 is slightly greater than the length of the retaining finger flanges 21. An important advantage of effecting the interlocked relationship of the two cover components by means of the retaining finger extensions 21 within the socket groove 31 is that in the course of assembly, the fingers 21 can be bent and thrustingly forced into the socket groove 31 after the ring member 18 has been preformed.

A substantially concentric permanent relationship of the cover components 17 and 18 is assured by the provision of locking shoulders 32 at the proximal ends of the fingers 21 and which shoulder structure is coactive with the edge of the underturned generally radially outwardly extending marginal flange 22 of the ring member. Through this arrangement not only are the cover components interlocked against axial separation, but they are also thoroughly interlocked against relative eccentric displacement.

The present application is a division of my application Serial No. 566,229, filed Februray 17, 1956.

It will be understood that modifications and variations may be effected without departing from the scope of the novel concepts of the present invention.

I claim as my invention:

1. In a wheel structure including a tire rim and a cover for disposition at the outer side of the wheel, the cover including a circular cover body having a series of generally radially outwardly projecting marginal tab extension flanges, and a supporting and retaining ring member comprising an annulus disposed in overlying concealing relation to said tabs and having at its radially outer margin a generally radially inwardly extending flange therebehind affording with the body of the annulus a radially inwardly opening socket groove within which said tab flanges are retainingly engaged, said marginal annulus flange having extending axially inwardly from the radially inner portion thereof cover retaining structure retainingly engageable with a flange of the tire rim, said retaining structure comprising an annular generally axially inwardly extending flange which is radially inwardly resiliently deflectable incident to engagement of said retaining means with the tire rim flange and thereby acting to increase the engaging clamping action of said annulus marginal flange against said tab flanges.

2. In a wheel cover for disposition over the outer side of a vehicle wheel including a tire rim, a circular cover body having an axially inwardly dished intermediate portion directed at its radially outer side generally radially and axially outwardly and provided with a generally radially extending circumferentially spaced series of interlock tab flange extensions having at their proximal end portions generally radially inwardly facing shoulder means, and a cover retaining ring member comprising an annular body of a width to overlie said interlock tab flanges and provided at its radially outer side with an underturned flange providing with the ring body a generally radially inwardly opening groove within which the distal end portions of the tab flanges are clampingly engaged, said underturned flange having extending from the radially inner portion thereof cover retaining structure engageable retainingly with the tire rim in press-on, press-off relation, said tab flanges bearing against the axially inner side of said ring body, the radially inner margin of said ring body being turned under and providing a generally radially outwardly projecting flange portion which rests against the radially outer side portion of said cover body adjacent juncture with the tab flanges, the tip of said radially inner marginal underturned flange opposing said proximal end portion shoulder means of the tab flanges coactively in interlocking relation to maintain the cover body and ring against relative eccentric displacement.

References Cited in the file of this patent

UNITED STATES PATENTS

| | | |
|---|---|---|
| 2,404,390 | Lyon | July 23, 1946 |
| 2,444,054 | Lyon | June 29, 1948 |